(12) United States Patent
Wong et al.

(10) Patent No.: US 11,564,158 B2
(45) Date of Patent: *Jan. 24, 2023

(54) SERVICE PROVIDER SELECTION IN A WIRELESS NETWORK

(71) Applicant: Charter Communications Operating, LLC, St. Louis, MO (US)

(72) Inventors: Curt C. Wong, Bellevue, WA (US); Maulik V. Vaidya, Palmdale, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 89 days.

This patent is subject to a terminal disclaimer.

(21) Appl. No.: 17/069,062

(22) Filed: Oct. 13, 2020

(65) Prior Publication Data

US 2021/0029629 A1 Jan. 28, 2021

Related U.S. Application Data

(60) Continuation of application No. 16/662,490, filed on Oct. 24, 2019, now Pat. No. 10,841,873, which is a continuation of application No. 16/380,795, filed on Apr. 10, 2019, now Pat. No. 10,484,939, which is a division of application No. 15/808,133, filed on Nov. 9, 2017, now Pat. No. 10,362,532.

(51) Int. Cl.
*H04W 48/18* (2009.01)
*H04W 76/10* (2018.01)

(52) U.S. Cl.
CPC .......... *H04W 48/18* (2013.01); *H04W 76/10* (2018.02)

(58) Field of Classification Search
CPC . H04W 52/0203; H04W 48/18; H04W 76/10; H04W 8/183; H04L 63/0435
See application file for complete search history.

(56) References Cited

U.S. PATENT DOCUMENTS

| | | | |
|---|---|---|---|
| 2008/0130554 A1 | 6/2008 | Gisby et al. | |
| 2008/0139210 A1 | 6/2008 | Gisby et al. | |
| 2009/0305671 A1 | 12/2009 | Luft et al. | |
| 2015/0245207 A1 | 8/2015 | Luft et al. | |
| 2016/0249217 A1 | 8/2016 | Luft et al. | |
| 2016/0249223 A1* | 8/2016 | Egner | H04W 16/14 |
| 2019/0141624 A1* | 5/2019 | Wong | H04W 76/10 |

* cited by examiner

*Primary Examiner* — Diane D Mizrahi
(74) *Attorney, Agent, or Firm* — Armis IP Law, LLC

(57) ABSTRACT

According to one configuration, a shared wireless access node supports wireless access for multiple wireless network service providers. A mobile communication device receives notification of multiple wireless network service providers, each of which provides access to a remote network through the shared wireless access node. The notification includes connection information such as priority information assigned to the wireless network service providers. The priority information indicates an order in which to select amongst the multiple available wireless network service providers to access the remote network. Based at least in part on the priority information, the mobile communication device selects a wireless network service provider amongst the multiple wireless network service providers. The mobile communication device communicates with the wireless access node to establish a wireless communication link to access the remote network through the corresponding wireless access node using wireless services provided by the selected service provider.

23 Claims, 10 Drawing Sheets

SERVICE PROVIDER SELECTION IN A WIRELESS NETWORK

RELATED APPLICATIONS

This application is a continuation application of earlier filed U.S. patent application Ser. No. 16/662,490 entitled "SERVICE PROVIDER SELECTION IN A WIRELESS NETWORK," filed on Oct. 24, 2019, the entire teachings of which are incorporated herein by this reference.

U.S. patent application Ser. No. 16/662,490 is a continuation application of earlier filed U.S. patent application Ser. No. 16/380,795 entitled "SERVICE PROVIDER SELECTION IN A WIRELESS NETWORK," filed on Apr. 10, 2019, the entire teachings of which are incorporated herein by this reference.

U.S. patent application Ser. No. 16/380,795 is a divisional application of earlier filed U.S. patent application Ser. No. 15/808,133 entitled "SERVICE PROVIDER SELECTION IN A WIRELESS NETWORK," filed on Nov. 9, 2017, the entire teachings of which are incorporated herein by this reference.

BACKGROUND

Conventional LTE (Long Term Evolution) cellular networks typically include a core network, a RAN (Radio Access Network), and one or more mobile communication devices (so-called UE or User Equipment).

The Radio Access Network (RAN) resides between user equipment (UE) such as a mobile phone, a computer, or any remotely controlled machine and provides connection with its core network (CN). As its name suggests, the radio access network provides respective user equipment access (such as Internet access) via the core network.

In certain instances, conventional LTE networks offer both voice and data services to user equipment via a single subscription such as a single SIM (Subscriber Identity Module). As well known, a Subscriber Identity Module (SIM) is an integrated circuit that securely stores information such as the International Mobile Subscriber Identity (IMSI) number and its related key. This information is used to identify and authenticate subscribers on mobile telephony devices (such as mobile phones and computers). It is also possible to store contact information on many SIM cards.

A new-shared spectrum scheme is being introduced in the United States at 3.5 GHz called CBRS (Citizens Broadband Radio Service). This new band can be used to provide LTE communications to mobile communication devices in a wireless network.

It has been proposed via CBRS working group that a wireless access node (such as a so-called neutral host network) can be configured to implement use of LTE services over CBRS for multiple different service providers.

BRIEF DESCRIPTION OF EMBODIMENTS

The conventional assumption is that UE is only associated with one credential. The use-case with a single UE containing multiple credentials to access a shared wireless access node (a.k.a., neutral host network or NHN) is not addressed by conventional techniques. For example, a UE can have two credentials, one from MNO (Mobile Network Operator) SIM and with another one from a private network with certificate/user=passed based credential.

This disclosure includes the observation that it would be useful to specify a way for the network to control (or influence) how UE (User Equipment) should select which participating service provider (i.e., and which credential) to use when accessing the shared wireless access node in the event that the UE has multiple available credentials to use different wireless network service providers. One possible use of this solution is to allow the shared wireless access node to offer different business arrangement with service provider by allowing different traffic distribution ratio among service providers at the shared wireless access node.

Embodiments herein provide novel ways of providing expanded use of wireless network services to mobile communication devices (user equipment) in a wireless network environment.

More specifically, according to first embodiments, multiple wireless network service providers share use of a single wireless access node (a.k.a. a neutral host network or shared host resource) to provide different wireless services to corresponding one or more communication devices in a wireless network.

During operation, in these first embodiments, a mobile communication device in the wireless network receives notification (such as via a wireless communication received from the shared wireless access node) of multiple wireless network service providers that provide access to a remote network (such as the Internet) through the shared wireless access node (host). In one embodiment, the notification includes connection information such as priority information assigned to the multiple wireless network service providers. The priority information (connection information) influences or indicates which service provider and corresponding wireless network services are to be used by the mobile communication device to use the wireless network. More specifically, the priority information can be configured to indicate a respective ranking associated with the multiple available wireless network service providers providing wireless services from the shared wireless access node. The mobile communication device uses the received ranking information (connection information) to select a service provider in which to access the remote network.

Based at least in part on the priority information, the mobile communication device selects a wireless network service provider. The mobile communication device uses the selected wireless network service provider (such as a first wireless network service provider) amongst the multiple wireless network service providers to access the remote network. In accordance with one embodiment, subsequent to selecting the first wireless network service provider such as based on the received priority information, the communication device communicates with the shared wireless access node to establish a wireless communication link to access the remote network through the shared wireless access node using wireless services provided by the selected (first) wireless network service provider.

These first embodiments are useful over conventional techniques. For example, providing connection information (such as priority information or the like) to the mobile communication device enables the shared wireless access node to influence or indicate which wireless service of a corresponding service provider is to be used (or are preferably used) to provide the mobile communication device access through the shared wireless access node to the remote network. These and more specific embodiments are further discussed below.

In accordance with second embodiments as discussed herein, a mobile communication device transmits a first wireless communication including a first request to establish a wireless communication link with a shared wireless access node through which each of multiple wireless network service providers provide access to a remote network. The first request indicates a first wireless network service provider of the multiple wireless network service providers. In response to transmitting the first request to establish the wireless connection with the wireless access node, the mobile communication device receives a command in a wireless response such as a wireless communication from the shared wireless access node. The wireless response from the shared wireless access node notifies the first mobile communication device to use a service provider other than the originally requested first wireless network service provider to access the remote network.

In accordance with the command (notification from the wireless access node), the mobile communication device then transmits a second wireless communication including a second request (such as to the shared wireless access node) to establish the wireless communication link with the shared wireless access node. The second request indicates a second wireless network service provider of the multiple wireless network service providers.

In addition to sending the second request, the mobile communication device forwards appropriate credentials for the second wireless network service provider to the wireless access node to establish the wireless communication link.

Accordingly, a respective communication device may request use of a first service provider and corresponding services to establish a wireless communication link. Via a communication from the shared wireless access node, the respective communication device is notified to use a different wireless network service provider than the originally requested service provider.

These second embodiments are useful over conventional techniques. For example, the notification from the shared wireless access node to the mobile communication device enables the shared wireless access node to control or influence which of the multiple service providers and corresponding service is to be used to provide the mobile communication device access through the shared wireless access node to the remote network.

In accordance with third embodiments as discussed herein, a mobile communication device detects identities of multiple wireless network service providers, each of which provides access to a remote network through a shared wireless access node. The mobile communication device can detect the identities in any suitable manner. For example, in one embodiment, the mobile communication device receives a notification of the identities in a wireless communication from the shared wireless access node. Additionally or alternatively, the mobile communication device can be configured to locally store the identities of the service providers associated with the shared wireless access node.

To use wireless network services provided by the shared wireless access node, assume that the mobile communication device selects a first wireless network service provider amongst the multiple wireless network service providers. In one embodiment, the mobile communication device (user equipment) can be configured to access a policy provided by a user of the mobile communication device. The policy can be configured to indicate a priority ranking of different service providers to which the user subscribes. The ranking information indicates which of the service providers to use when establish g a wireless communication link with a shared wireless access node.

In this example embodiment, assume that the user selects a first wireless network service provider in the priority ranking because it ranks highest in the policy and is supported by a respective available wireless access node.

In furtherance of using the wireless network services of the selected first wireless network service provider, the mobile communication device obtains credentials allocated to use wireless network services provided by the first wireless network service provider. These credentials can be stored in any suitable location such as in the mobile communication device. The mobile communication device then transmits the obtained credentials associated with the selected first wireless service provider to the shared wireless access node to establish a wireless communication link with the wireless access node to access the remote network.

These third embodiments are useful over conventional techniques. For example, the mobile communication device and corresponding user can be configured to select which of the multiple service providers and corresponding service is to be used to provide the mobile communication device access through the shared wireless access node to the remote network.

These and other more specific embodiments are disclosed in more detail below.

Any of the resources as discussed herein can include one or more computerized devices, mobile communication devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (such as a computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate use of a wireless access node to access a remote network such as the Internet. The instructions, when executed by computer processor hardware, cause the computer processor hardware (such as one or more processor devices) to: receive notification of multiple wireless network service providers, each of which provide access to a remote network through a corresponding shared wireless access node, the notification including priority information assigned to the multiple wireless network service providers;

select a first wireless network service provider amongst the multiple wireless network service providers; and communicate with the wireless access node to establish a wireless communication link to access the remote network through the corresponding shared wireless access node using wireless services provided by the first wireless network service provider.

Another embodiment herein includes a computer readable storage medium and/or system having instructions stored thereon to facilitate use of a wireless access node to access a remote network such as the Internet. The instructions, when executed by computer processor hardware, cause the computer processor hardware (such as one or more processor devices) to: transmit a first wireless communication including a first request to establish a wireless communication link with a shared wireless access node through which each of multiple wireless network service providers provide access to a remote network, the first request indicating a first wireless network service provider of the multiple wireless network service providers; receive a command in a wireless response to the first wireless communication, the wireless response notifying the mobile communication device to use a service provider other than the first wireless network service provider to access the remote network; and transmit a second wireless communication including a second request to establish the wireless communication link with the shared wireless access node, the second request indicating a second wireless network service provider of the multiple wireless network service providers.

Yet another embodiment includes a computer readable storage medium and/or system having instructions stored thereon to facilitate use of a wireless access node to access a remote network such as the Internet. The instructions, when executed by computer processor hardware, cause the computer processor hardware (such as one or more processor devices) to: detect identities of multiple wireless network service providers, each of which provides access to a remote network through a shared wireless access node; select a first wireless network service provider amongst the multiple wireless network service providers; obtain credentials allocated to use wireless network services provided by the first wireless network service provider; and transmit credentials associated with the first wireless service provider to establish a wireless communication link with the wireless access node to access the remote network.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of controlling a remote media system. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
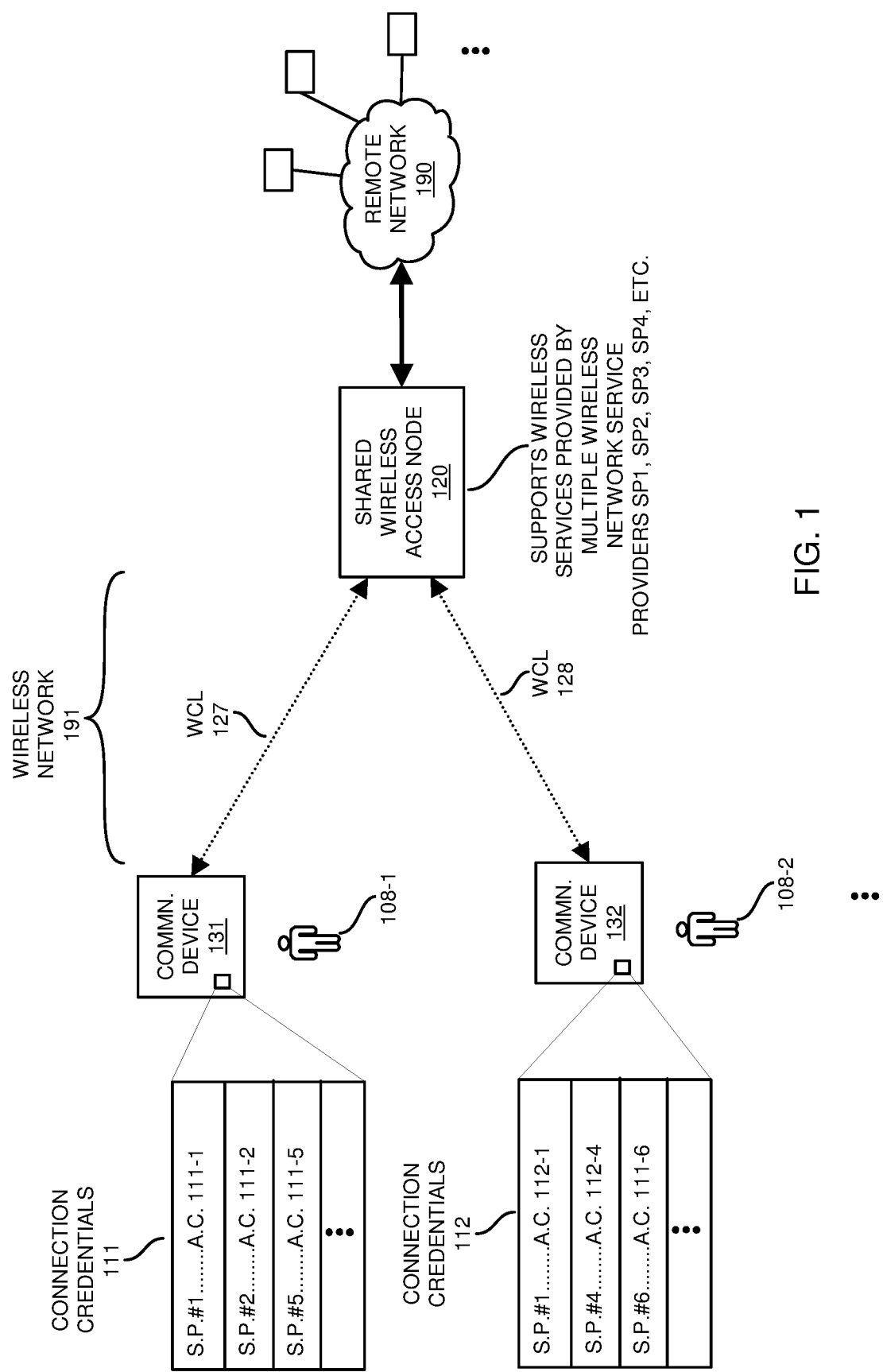
FIG. 1 is an example block diagram of hardware/software resources to provide wireless network services at a wireless access node from multiple different service providers according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Now, more specifically, FIG. 1 is an example block diagram of hardware/software resources to provide wireless network services at a wireless access node shared by multiple different service providers according to embodiments herein.

As shown, the network environment 100 includes shared wireless access node 120, remote network 190, and multiple communication devices 131, 132, etc.

Shared wireless access node 120 (such as hardware and/or software) supports wireless network 191 and corresponding services for each of multiple service providers such as service provider #1 (SP1), service provider #2 (SP2), service provider #3 (SP3), service provider #4 (SP4), etc.

In one embodiment, the shared wireless access node 120 and the mobile communication devices communicate with each other based on communications over bandwidth or wireless frequency spectrum allocated from the CBRS (Citizen Band Radio Service) band.

By further way of non-limiting example, the shared wireless access node 120 (neutral host network) and the communication devices 131, 132, etc., wirelessly communicate with each other in accordance with any suitable protocol such as the LTE (Long Term Evolution) communication protocol.

Each of the communication devices may have (SIM-based and/or non SIM-based) access to wireless services provided by multiple different service providers. For example, as shown in FIG. 1, user 108-1 operating communication device 131 subscribes to use of wireless services provided by service provider #1, service provider #2, service provider #5, etc.

Communication device 131 (such as hardware and/or software) is programmed with appropriate (SIM-based or non-SIM based) credentials to use the wireless services provided by the different service providers. For example, communication device 131 is programmed with allocated credentials 111-1 to use wireless services provided by service provider #1; communication device 131 is programmed with allocated credentials 111-2 to use wireless services provided by service provider #2; communication device 131 is programmed with allocated credentials 111-5 to use wireless services provided by service provider #5; etc.

As further shown, user 108-2 operating communication device 132 subscribes to use of wireless services provided by service provider #1, service provider #4, service provider #6, etc. Communication device 132 is also programmed with credentials to use the wireless services provided by the different service providers.

For example, communication device 132 is programmed with allocated credentials 112-1 to use wireless services provided by service provider #1; communication device 132 is programmed with allocated credentials 112-4 to use wireless services provided by service provider #4; communication device 132 is programmed with allocated credentials 111-6 to use wireless services provided by service provider 6; etc.

Note that the credentials can vary depending on the embodiment. For example, as previously discussed, connection credentials 111, 112, etc., can include one or more SIM-based credentials to use wireless services of a respective wireless service provider; connection credentials 111, 112, etc., can include one or more non-SIM based credentials to use wireless services of a respective wireless service provider.

As further discussed below, the communication devices 131 and 132 use the credentials 111 and 112 to establish respective wireless communication links 127 and 128 with shared wireless access node 120. Via communications over a wireless through the shared wireless access node 120, the users 108 have access to server resources in remote network 190.

Figure 2:
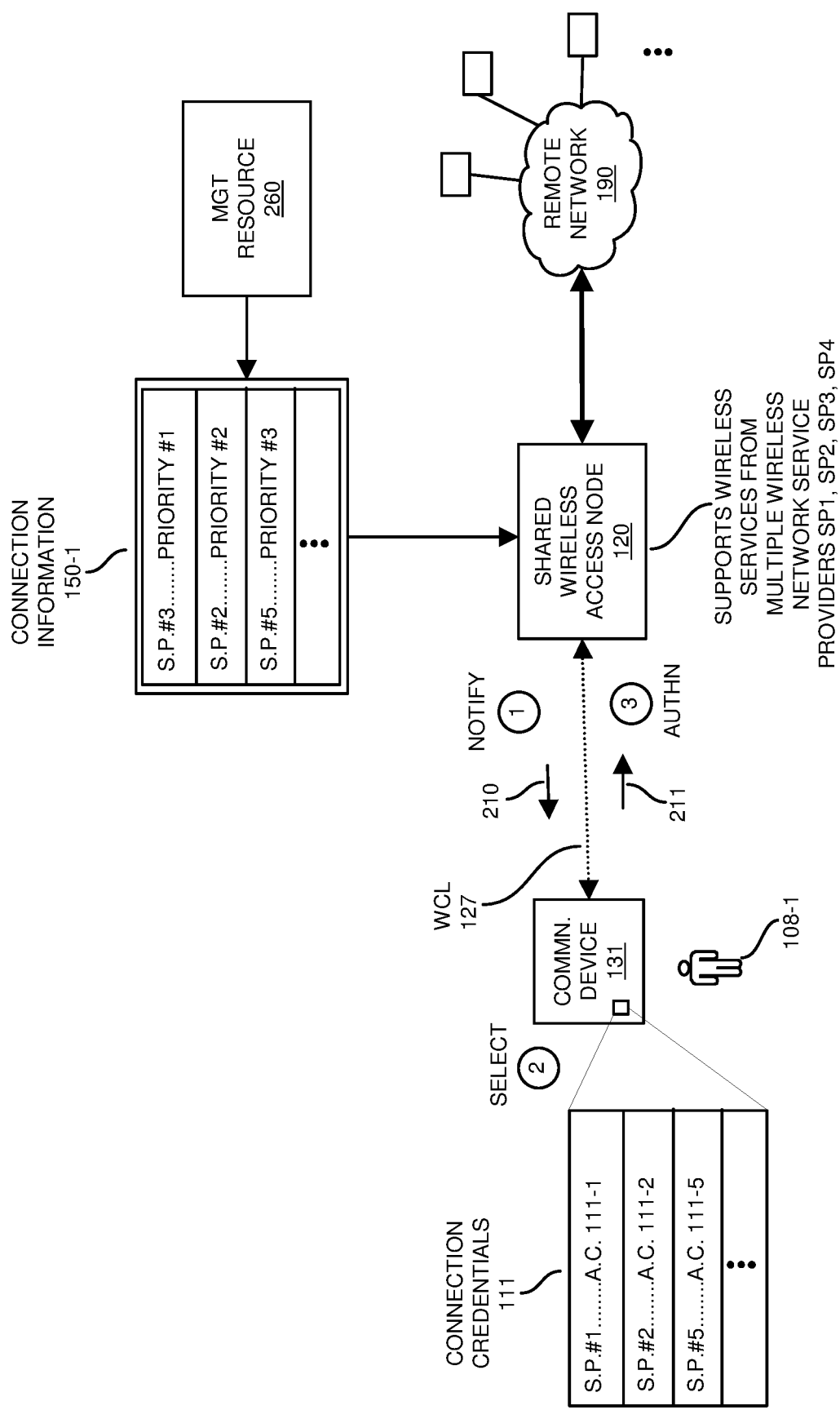
FIG. 2 is an example diagram illustrating distribution of connection information from a shared wireless access node to a respective one or more mobile communication devices in a network environment according to embodiments herein.

FIG. 2 is an example diagram illustrating distribution of connection information from a shared wireless access node to a respective one or more mobile communication devices in a network environment according to embodiments herein.

As previously discussed, multiple wireless network service providers (service provider #1, service provider #2, service provider #3, service provider #4, etc.) share use of a single wireless access node 120 (a.k.a., a neutral host network or shared host resource) to provide different wireless services to corresponding one or more communication devices in network environment 100. As previously discussed, the multiple wireless network service providers provide wireless access over wireless network to a remote network 190 (such as the Internet) through the shared wireless access node 120 (host).

In this example embodiment, mobile communication device 131 in the wireless network environment 100 receives notification 210 (such as via a wireless communication) transmitted from the shared wireless access node 120. The notification 210 includes connection information 150-1 generated by the manager resource 260.

In general, the connection information 150-1 includes one or more data bits associated with each service provider identity. Such data bits indicate a preferred priority using different service provider's services.

For example, in one embodiment, the management resource 260 produces the connection information 150-1 to indicate that the service provider #3 is assigned the highest priority; service provider #2 is assigned the second highest priority; the service provider #5 is assigned the third highest priority; so on.

In this example embodiment, the connection information 150-1 indicates that it is preferred that a respective new user use wireless services provided by the service provider #3; if the new user does not subscribe to service provider #3, the connection information 150-1 indicates that it is preferred that a respective new user use wireless services provided by the service provider #2; if the new user does not subscribe to service provider #2, the connection information 150-1 indicates that it is preferred that a respective new user use wireless services provided by the service provider #5; and so on.

Accordingly, the connection information 150-1 notifies the communication device 131 of a preferred priority of which wireless services to use when establishing a new wireless communication link. In other words, the connection information 150-1 in notification 210 is priority information indicating an ordered preference in which to select amongst the multiple available wireless network service providers to access the remote network 190 through the wireless access node 120 shared by the multiple available wireless network service providers.

Note that the notification 210 can be transmitted by the shared wireless access node 120 in response to receiving a query from the communication device 131. The query can be a request to establish a wireless communication link, a request to learn of different service providers supported by the shared wireless access node 120, etc.

Alternatively, the shared wireless access node 120 can be configured to occasionally, periodically, etc., transmit wireless beacon information (notification 210) including the connection information 150-1 to notify any communication devices within wireless range of the shared wireless access node 120 of its presence as well as available service providers.

In accordance with further embodiments, the mobile communication devices receiving notification 210 use the ranking information as indicated by the connection information 150-1 to select a service provider in which to access the remote network 190 via wireless communications over communication link 127. For example, based at least in part on the connection information 150-1, the mobile communication device 131 selects a service provider amongst the multiple wireless network service providers to access the remote network 190.

To select a service provider, the mobile communication device compares its list of service providers (such as service provider #1, service provider #2, service provider #5 etc., to which the user 108-1 subscribes) to the connection information 150-1. The communication device 131 identifies a subset of the service providers in the connection information 150-1 to which the user 108-1 subscribes and then selects, from the identified subset, a highest ranking service provider in the list.

Assume that the communication device 131 detects that the user 108-1 only subscribes to service provider #2 and service provider #5 present in the connection information 150-1. The identified subset is then service provider #2 and service provider #5. In such an instance, the communication device 131 selects to use wireless services provided by service provider #2 because it is the highest priority in the subset as indicated by the connection information 150-1.

Subsequent to selecting the wireless network service provider #2 such as based on the received connection information 150-1, the communication device 131 communicates with the shared wireless access node 120 via communications 211 to establish a wireless communication link 127 to access the remote network 190 through the shared wireless access node 120 using wireless services provided by the selected wireless network service provider #2.

In one embodiment, to establish the wireless communication link 127 to access the remote network 190 through the shared wireless access node 120, the communication device 131 retrieves credentials 111-2 amongst multiple sets of credentials 111 (allocated by service provider #2) and communicates the credentials 111-2 to the wireless access node 120 to use the wireless network services provided by the wireless network service provider #2.

Note that these first embodiments are useful over conventional techniques. For example, providing connection information 150-1 to the mobile communication device 131 enables the shared wireless access node 120 to influence or indicate which wireless service of a corresponding service provider is to be used (or are preferably used) to provide the mobile communication devices access through the shared wireless access node 120 to the remote network 190.

For sake of further illustration, assume that the communication device 131 is denied use of wireless services provided by the service provider #2 in the above example. In such an instance, in response to detecting an inability to authenticate the mobile communication device 131 using credentials 111-2, the communication device 131 selects a next available service provider in the subset (such as service provider #5) as discussed above. To establish the wireless communication link 127, the communication device 131 retrieves credentials 111-5 from the connection credentials 111 (which is allocated to use wireless network services provided by the service provider #5) and communicates the credentials 111-5 to the wireless access node 120 to authenticate the mobile communication device to use the wireless network services provided by the wireless network service provider #5.

Further Example Embodiments

Assume that PSP-ID is an identity of a participating service provider that provides services via the shared wireless access node 120. The PSP-IDs of a shared wireless access node 120 (neutral host network) are broadcasted in a message such via SIB17 by re-using the wlan-OffloadInfoPerPLMN-List-r12 for the CBRS-I PLMN value. The PSP-ID (such as in connection information 150-1) can be configured to include priority indication for PSP selection if more than one PSP can be selected by the UE.

Shared wireless access node 120 is provisioned with information about whether a given eNB should operate as an neutral host network RAN and shall be provisioned with list of PSP-identities to be sent to the eNB. NOTE: An NH-MME is aware of CBRS-I and CSG/CBRS-NID associated with each connected eNB based on information included by the eNB in the S1 Setup Request. A PSP may support S2a. A UE can determine whether a PSP supports S2a or not based on information broadcast in SIB17.

SIB type 17 can be used for announcing PSP identities (PSP-IDs) and support WLAN offloading at the same time for the neutral host network. SIB type 17 is specified in 3GPP TS 36.331. The PSP-IDs are announced using the WLAN-Id-List-r12 corresponding to CBRS-I. If WLAN offloading is announced as well, the WLAN-Identifiers will be placed in the beginning of the WLAN-Id-List-r12.

First entry of the WLAN-Id-List-r12 that is used to carry PSP-information, is marked with a special bssid-r12 value, 03:ff:ff:ff:ff:ff, which is a multicast and locally administered MAC address and thus will not be considered to be a valid Wi-Fi BSSID. The ssid-r12 field of that entry and subsequent entries in WLAN-Id-List-r12 are interpreted as PSP-information lists.

Information list: the ssid-r12 (of length 32×8=256 bits) is to be interpreted as a sequence of entries, each entry is 25 bits composed of a 24 bit PSP-ID followed by a bit that indicates whether the PSP supports S2a. Within the 24 bits, the 2 (most significant bits) is used to denote the priority of this PSP (this gives a value from zero to 3 and allow up to 4 group of PSP for selection differentiation). The user equipment, which can select from more than one participating service provider, uses this value to determine which PSP's credential to try first.

The wlan-OffloadConfigCommon-r12 does not apply for the WLAN-Identifiers-r12 entries carrying PSP-information list.

The priority indication in connection information 150 can be updated periodically via management resource 260 (i.e., to allow different traffic distribution to different PSP). This can be done based on O&M input of new signaling indication from MME over a respective S1 interface.

Figure 3:
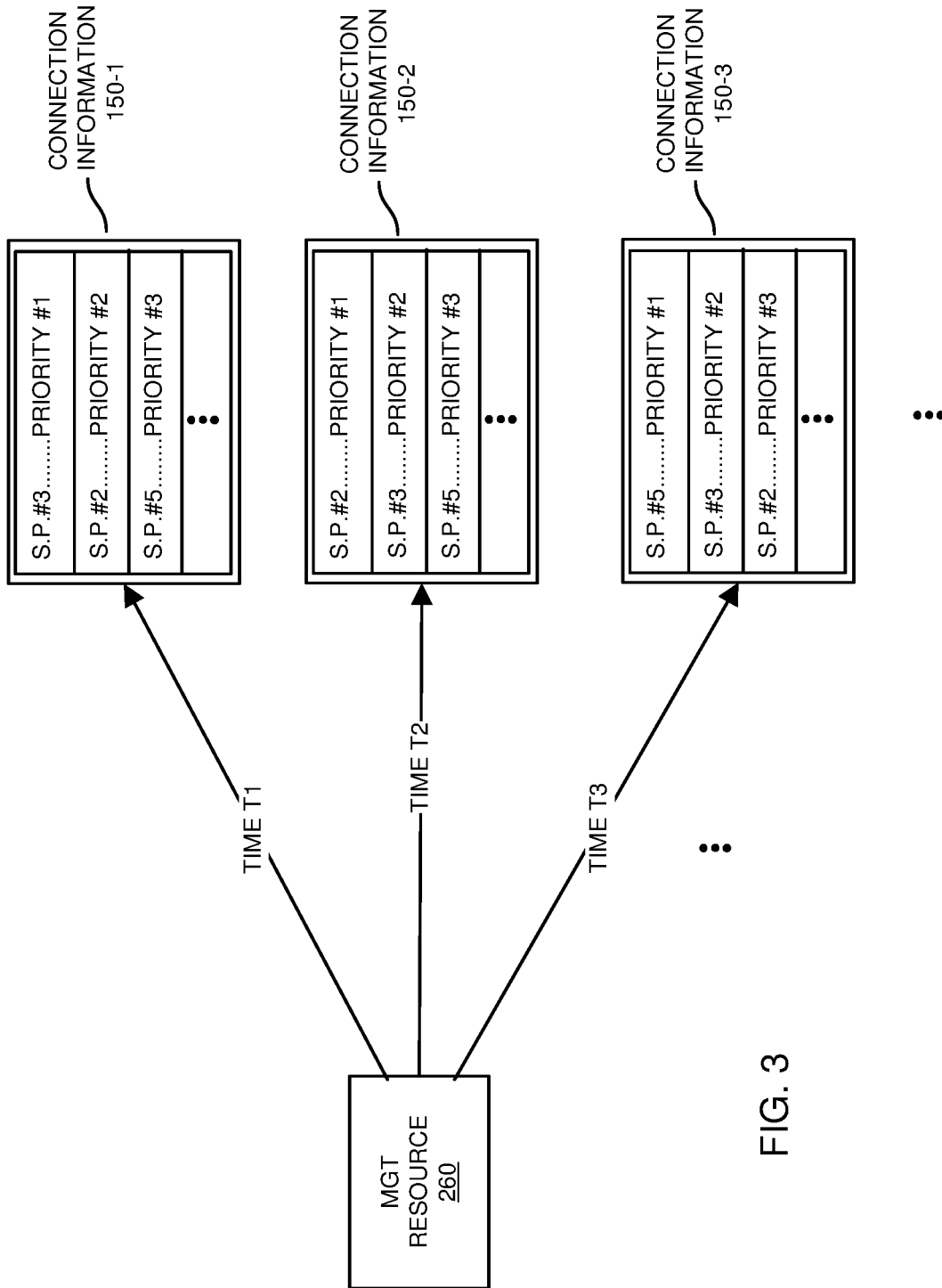
FIG. 3 is an example diagram illustrating dynamically updating connection information associated with multiple service providers sharing a wireless access node according to embodiments herein.

FIG. 3 is an example diagram illustrating dynamically updating connection information associated with multiple service providers sharing a wireless access node according to embodiments herein.

As shown, management resource 260 (such as hardware and/or software) dynamically produces connection information 150.

In one embodiment, the management resource 260 produces connection information 150 based on current operating conditions. For example, each service provider can be assigned use of a portion of wireless bandwidth to provide wireless services to its subscribers. The assigned portions can change over time.

If the wireless services provided by a given service provider reaches an assigned limit, the management resource 260 can be configured to change a priority of the service providers to encourage new users to use a different service provider having available bandwidth for use by the new wireless user.

In this example embodiment, at time T1, the management resource 260 generates connection information 150-1 indicating that service provider #3 is currently assigned highest priority; service provider #2 is assigned second highest priority; service provider #5 is assigned third highest priority; and so on. As previously discussed, the ranking of the service providers encourages or causes the different users to use wireless services provided by the service providers that are higher ranked in the list between time T1 and time T2.

In this example embodiment, assume that the service provider #3 becomes saturated with providing wireless services to too many communication devices or uses too much of the available bandwidth associated with shared wireless access node 120. In such an instance, at time T2, the management resource 260 generates connection information 150-2 indicating that service provider #2 is currently assigned highest priority; service provider #3 is assigned second highest priority; service provider #5 is assigned third highest priority; and so on. In a similar manner as previously discussed, the ranking of the service providers encourages or causes the different users to use wireless services provided by the service providers that are higher ranked in the list between time T2 and time T3.

In this example embodiment, assume that the service provider #2 becomes saturated with providing wireless services to too many communication devices or uses too much of the available bandwidth associated with shared wireless access node 120. In such an instance, at time T3, the management resource 260 generates connection information 150-3 indicating that service provider #5 is currently assigned highest priority; service provider #3 is assigned second highest priority; service provider #2 is assigned third highest priority; and so on. As previously discussed, the ranking of the service providers encourages or causes the new users to use wireless services provided by the service providers that are higher ranked in the list between time T3 and time T4.

Accordingly, the connection information 150 dynamically changes to accommodate different network conditions.

Figure 4:
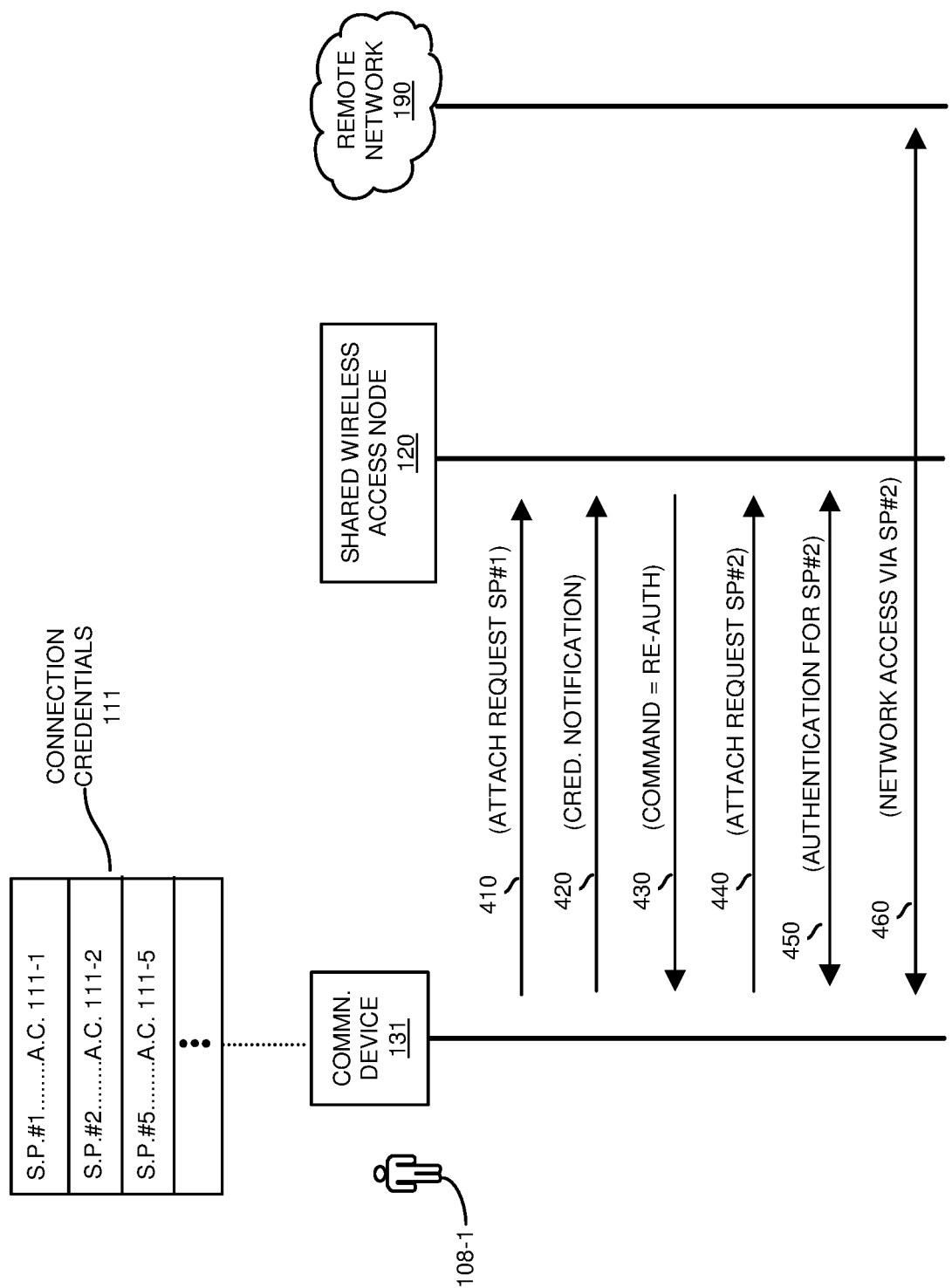
FIG. 4 is an example diagram illustrating redirection of a mobile communication device to use a different service provider at a shared wireless access node according to embodiments herein.

FIG. 4 is an example diagram illustrating redirection of a mobile communication device to use a different service provider at a shared wireless access node according to embodiments herein.

In general, embodiments herein include communicating from a shared wireless access node (neutral host network) to user equipment to re-negotiate use of a different PSP and corresponding credentials by a user. In this solution, the shared wireless access node sends a new message to UE to notify the user equipment to re-authenticate using a different credential (different service provider).

In this example embodiment, the user 108-1 provides input to the mobile communication device 131 to establish a wireless communication link 127 with the shared wireless access node 120. In one embodiment, the shared wireless access node 120 and the mobile communication device 131 communicate with each other based on communications over bandwidth allocated from the CBRS (Citizen Band Radio Service) band.

By way of non-limiting example, the wireless access node 120 and the communication device 131 wirelessly communicate with each other in accordance with the LTE (Long Term Evolution) communication protocol.

In response to receiving input (such as from user 108-1 or other entity) to establish wireless communication link 127, the mobile communication device 131 transmits wireless communications 410, which includes a first request to establish a wireless communication link 127 with a shared wireless access node 120. The shared wireless access node 120 supports services from each of multiple wireless network service providers (such as service provider #1, service provider #2, service provider #5, etc.) provide access to a remote network 190.

The request in wireless communication 410 indicates to use service provider #1 associated with the shared wireless access node 120 to establish wireless communication link 127.

In addition to transmitting wireless communications 410 to shared wireless access node 120, note that the communication device 131 can be configured to further transmit wireless communications 420 to the shared wireless access node 120. Since the communication device 131 selected the service provider #1 to establish the wireless communication link 127, the communication device 131 transmits the corresponding access credentials 111-1 in the wireless communications 420 to the shared wireless access node 120. The authentication credentials 111-1 are allocated to the user 108-1 of the mobile communication device 131 to use wireless network services provided by the wireless network service provider #1.

In one embodiment, prior to receiving wireless communications 430, via wireless communications 410 and/or 420, the mobile communication device 131 notifies the shared wireless access node 120 of the different service providers to which the user 108-1 subscribes. For example, in this example, the communication device 131 can be configured to notify the shared wireless access node 120 that the user 108-1 subscribes to service provider #1, service provider #2, service provider #5, etc., as indicated by connection credentials 111.

As further discussed below, in one embodiment, in response to receiving the wireless communications 410 and/or wireless communications 420, the shared wireless access node 120 transmits wireless communications 430 to the communication device 131. The wireless communications 430 redirecting the communication device 131 to establish the wireless communication link 127 with a different service provider than as received in wireless communications 410. This can occur due to any reason. For example, the shared wireless access node 120 may not provide support for service provider #1, services associated with the service provider #1 may be temporarily unavailable from the shared wireless access node 120, etc.

The wireless communications 430 (wireless response) notifies the mobile communication device 131 to use a service provider other than the originally requested wireless network service provider #1 to access the remote network 190 through the shared wireless access node 120. The wireless communications 430 can indicate the different wireless network service providers that are supported by the shared wireless access node 120.

Further in this example embodiment, the mobile communication device 131 selects wireless network service provider #2 to access the remote network 190 through the wireless access node 120 in response to receiving the command (in wireless communications 430) indicating to use a different service provider (i.e., a service provider other than wireless network service provider #1).

In one embodiment, the mobile communication device 131 selects the service provider #2 based on a command (such as wireless communications 430) from the shared wireless access node 120 indicating to use the service provider #2. Alternatively, the mobile communication device 131 can be configured to select the service provider #2 independently of any input received from the shared wireless access node 120 as an attempt to establish the wireless communication link 127.

In accordance with the redirect command (such as in wireless communications 430), the mobile communication device 131 transmits wireless communications 440 including a second request to the shared wireless access node 120. The second request in the wireless communications 440 indicates that the mobile communication device 131 would like to establish wireless communication link 127 using wireless services provided by the service provider #2. Via wireless communications 450, the mobile communication device forwards appropriate credentials 111-2 to use services provided by the second service provider #2 to the wireless access node 120 to establish the wireless communication link 127.

Accordingly, a respective communication device may request use of a first service provider and corresponding services to establish a wireless communication link. The respective communication device is notified, via the neutral host network, to use a different wireless network service provider than the originally requested service provider. Note that in accordance with further embodiments, the first request in wireless communications 410 can initiate a SIM (Subscriber Information Module) based authentication of the mobile communication device 131 to use wireless network services provided by the wireless network service provider #1; the second request in wireless communications 440 can initiate a non-SIM based authentication of the mobile communication device 131 to use wireless network services provided by the wireless network service provider #2.

Alternatively, the first request in wireless communications 410 can initiate a non-SIM (Subscriber Information Module) based authentication of the mobile communication device 131 to use wireless network services provided by a first wireless network service provider; the second request in wireless communications 440 can initiate a SIM based authentication of the mobile communication device 131 to use wireless network services provided by a second wireless network service provider.

Subsequent to completing authentication, via wireless communications 460, the communication device 131 is able to access remote network 190.

Figure 5:
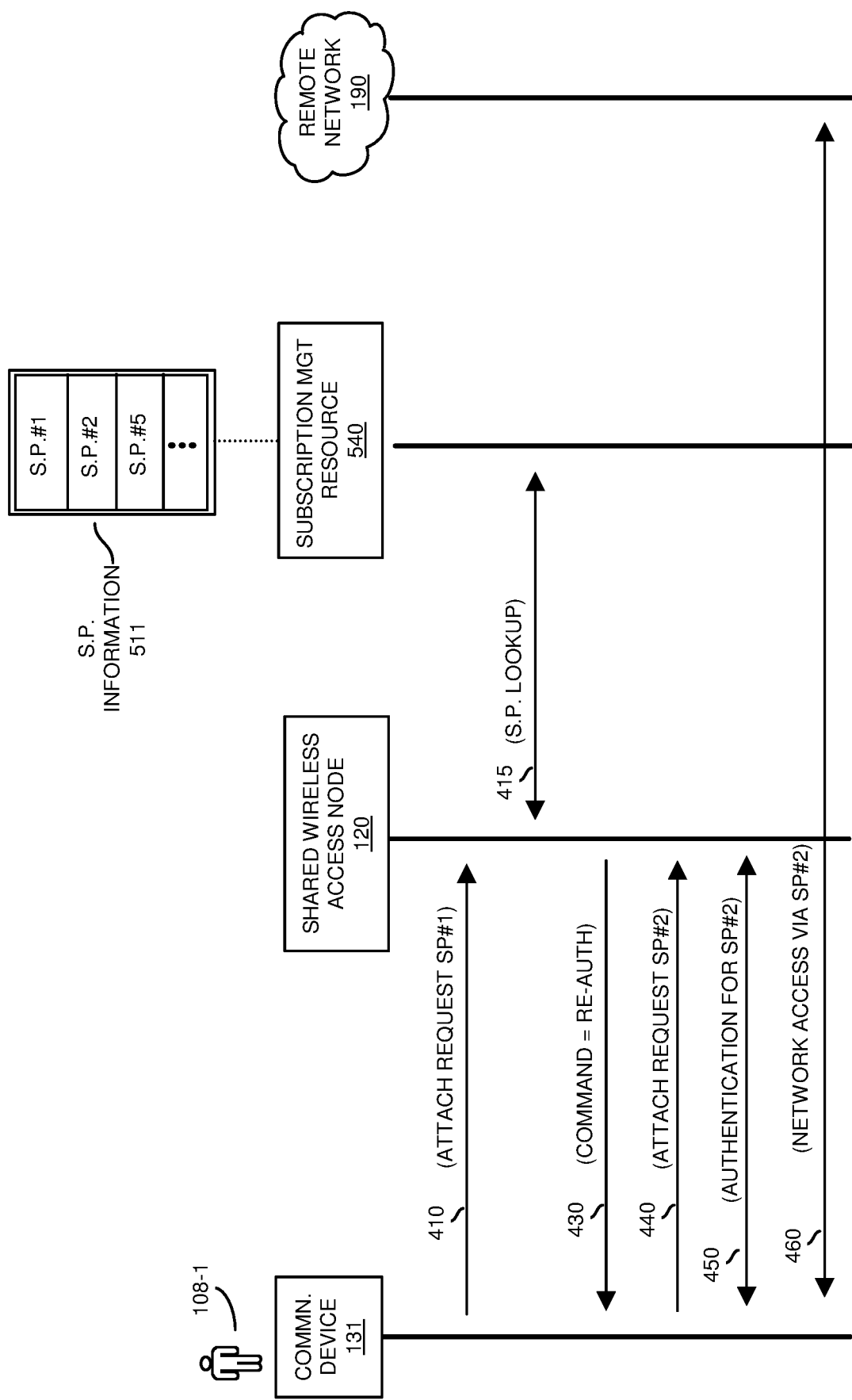
FIG. 5 is an example diagram illustrating redirection of a mobile communication device to use a different service provider at a shared wireless access node according to embodiments herein.

FIG. 5 is an example diagram illustrating redirection of a mobile communication device to use a different service provider at a shared wireless access node according to embodiments herein.

In this example embodiment, assume that the user 108-1 provides input to the mobile communication device 131 to establish a wireless communication link 127 with the shared wireless access node 120.

As previously discussed, the shared wireless access node 120 and the mobile communication device 131 can be configured to communicate with each other based on communications over bandwidth allocated from the CBRS (Citizen Band Radio Service) band. By further way of non-limiting example, the wireless access node 120 and the communication device 131 wirelessly communicate with each other in accordance with the LTE (Long Term Evolution) communication protocol.

In response to receiving input (such as from user 108-1) to establish wireless communication link 127, the mobile communication device 131 transmits wireless communications 410 to the shared wireless access node 120. The wireless communications 410 can include a first request to establish a wireless communication link 127 with a shared wireless access node 120 through which each of multiple wireless network service providers provide access to a remote network 190.

In this example, the request in wireless communications 410 can indicate to use service provider #1 associated with the shared wireless access node 120. Based on information in the received wireless communications 410, the shared wireless access node 120 is able to identify an identity of the communication device 131 and/or user 108-1. Alternatively, the wireless communications does not specify service provider.

To learn of wireless service providers and/or wireless services to which the user 108-1 subscribes, the shared wireless access node 120 transmits communications 415 (a lookup query) to the subscription management resource 540. In one embodiment, the subscription manager resource 540 performs a service provider lookup based on the identity of the communication device 131 and/or user 108-1. The identity can be based on any suitable information such as a unique identifier value (network address) assigned to the communication device, username, etc.

Assume further in this example that the subscription management resource 540 detects that the user 108-1 subscribes to use of service provider #1, service provider #2, service provider #5, etc.

As further discussed below, in one embodiment, in response to receiving the wireless communications 410 and/or results of lookup indicating service provider information 511, the shared wireless access node 120 transmits wireless communications 430 to the communication device 131. The wireless communications directs or redirects the communication device 131 to establish the wireless communication link 127 with a different service provider than as received in wireless communications 410. In a manner as previously discussed, this can occur due to any reason. For example, the shared wireless access node 120 may not provide support for service provider #1, services associated with the service provider #1 may be temporarily unavailable from the shared wireless access node 120, etc.

Accordingly, the wireless communications 430 (wireless response) notifies the mobile communication device 131 to use a service provider (such as other than the originally requested wireless network service provider #1) to access the remote network 190 through the shared wireless access node 120. In one embodiment, the shared wireless access node 120 selects wireless network service provider #2 to access the remote network 190 through the wireless access node 120.

In accordance with the command in wireless communications 430, the mobile communication device 131 transmits wireless communications 440 including a second request to the shared wireless access node 120. The second request in the wireless communications 440 indicates that the mobile communication device 131 would like to establish wireless communication link 127 using wireless services provided by the service provider #2. Via wireless communications 450, the mobile communication device forwards appropriate credentials 111-2 to use services provided by the second service provider to the wireless access node 120 to establish the wireless communication link 127.

Accordingly, a respective communication device may request use of a first service provider and corresponding services to establish a wireless communication link. The respective communication device is notified to use a particular wireless network service provider such as service provider #2.

Subsequent to authentication, via wireless communications 460, the communication device 131 is able to access remote network 190.

The following is a further summary of operations to potentially implement embodiments herein:

Operation 1. The UE (communication device 131) uses MNO's credential to attach to the neutral host network (shared wireless access node 120) using a SIM based method. UE may also indicate to the network which other credentials it has for accessing this neutral host network.

Operation 2. Neutral host network-MME (shared wireless access node 120) determines that UE should access this network using other credential instead of the one that is given from step 1. NH-MME sends a signaling message to UE to ask for re-Authentication using other credential (e.g., non-SIM based method). NH-MME can trigger this based on checking (via lookup) the MCC and MNC of the SIM identity from GUTI or IMSI. For example, based on the MCC/MNC, MME is aware from the lookup that this UE is also assigned with non-SIM based credential due to internal policy. Alternatively, note that UE may be given an indication in step 1 that it can support other credential for accessing this network.

Operation 3. UE re-attaches to the network using other credential (e.g, non-SIM based approach). Note: if UE does not have any other credential beside MNO's, UE can either explicitly reject or ignore this message from NH-MME. NH-MME will then continue with the MNO's credential from step 1.

Figure 6:
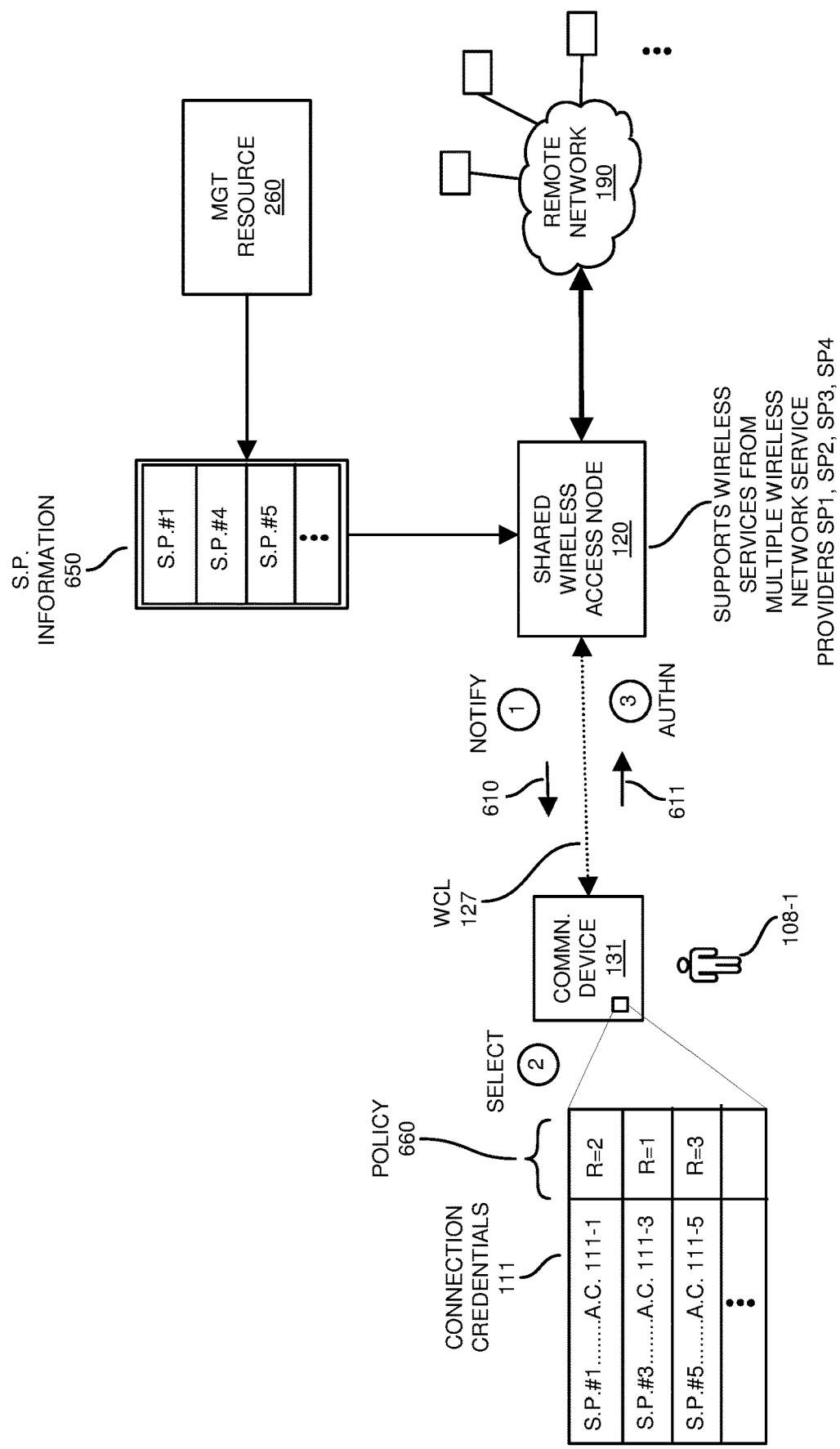
FIG. 6 is an example diagram illustrating selection of a wireless network service provider based on a user-generated policy according to embodiments herein.

FIG. 6 is an example diagram illustrating selection of a wireless network service provider based on a user-generated policy according to embodiments herein.

Communication device 131 monitors the wireless spectrum for communications (such a beacon signal) from shared wireless access node 120. In one embodiment, the shared wireless access node 120 transmits wireless communications 610 to indicate which service providers provide wireless services from shared wireless access node 120.

In one embodiment, the wireless communication 610 includes service provider information 650. Manager resource 260 generates the service provider information 650 to indicate the corresponding service providers that provide wireless services through the shared wireless access node 120.

Communication device 131 analyzes the contents of wireless communication 610 received from the wireless access node 120 to determine the identities of multiple wireless network service providers associated with shared wireless access node 120.

In this example embodiment, based on the received communications 610 including service provider information 650, the mobile communication device 131 detects identities of multiple wireless network service providers (such as service provider #1, service provider #4, service provider #5, etc.), each of which provides access to remote network 190 through the shared wireless access node 120.

Accordingly, the mobile communication device 120 receives notification of the service providers associated with shared wireless access node 120.

Further in this example embodiment, assume that the user 108-1 operating the communication device 131 subscribes to use of wireless services provided by service provider #1, wireless services provided by service provider #3, wireless services provided by service provider #5, etc.

As further shown, the communication device 131 stores connection credentials 111 associated with the different service providers to which the user 108-1 subscribes. The access credentials 111-1 support connectivity to wireless access nodes supported by service provider #1; access credentials 111-3 support connectivity to wireless access nodes supported by service provider #3; access credentials 111-5 support connectivity to wireless access nodes supported by service provider #5, etc.

Policy 660 (such as generated by user 108-1) indicates an ordered ranking of selecting the service providers for use of respective available services. For example, service provider #3 is ranked as the first choice (RANK=1, 1=most preferred) in which to establish a wireless communication link if services provided by the service provider #3 are available; service provider #5 is ranked as the second choice (RANK=2) in which to establish a wireless communication link if services provided by the service provider #5 are available; service provider #1 is ranked as the third choice (RANK=3) in which to establish a wireless communication link if services provided by the service provider #1 are available; etc.

To use wireless network services provided by the shared wireless access node 120, the mobile communication device 131 selects a wireless network service provider amongst the multiple wireless network service providers as indicated by service provider information 650.

In one embodiment, the mobile communication device (user equipment) can be configured to access a policy 660 provided by a user 108-1 of the mobile communication device 131. As previously discussed, the policy 660 indicates a priority ranking of different service providers to which the user 108-1 subscribes. In this example embodiment, the communication device 131 compares the service provider's information 650 to the policy 660 to identify which of the service providers to select. Since service provider #3 is not available, the communication device 131 selects the second-ranked service provider #5 and corresponding services because service provider #5 is highest ranked of available service providers associated with shared wireless access node 120 based on service provider information 650 and connection credentials 111.

In furtherance of using the wireless network services of the selected wireless network service provider #5, the mobile communication device 131 obtains credentials allocated to use wireless network services provided by the wireless network service provider #5. As previously discussed, connection credentials 111 can be stored in any suitable location such as in the mobile communication device 131.

The mobile communication device then transmits the credentials 111-5 associated with the wireless service provider #5 in wireless communications 611 to the shared wireless access node 120 to establish a wireless communication link 127 with the wireless access node to access the remote network 190.

After establishing wireless communication link 127, the mobile communication device 131 is able to access one or more server resources in network 190.

Note that the user-policy 650 can vary depending on parameters such as a current location of the mobile communication device 131. In such an instance, when the mobile communication device 131 is in a first location, the service providers as indicated by policy 650 can be ranked (from highest to lowest) as follows: service provider #3, service provider #5, service provider #1, etc. When the mobile communication device 131 is in a second location, the service providers as indicated by policy 650 can be ranked (from highest to lowest) as follows: service provider #1, service provider #3, service provider #5, etc. Accordingly, depending on a parameter such as location, the communication device 131 the ranking of service providers can vary.

Thus, selection of a wireless network service provider can include, at the mobile communication device 131, identifying a location of the mobile communication device and then selecting the wireless network service provider based on the policy 660 (input criteria) provided by a user 108-1 of the mobile communication device 131.

Thus, in accordance with certain embodiments, a simple implementation is to configure the UE with an internal policy by the operator on which participating service provider's (PSP's) credential to use if there are more than one available to select. UE configuration is normally done with device management object (e.g., OMA DM). However, this method is normally used when the UE is served by the same operator (i.e., same PSP). If the same UE is served by two different service providers/PSP then the both service provider must agree on how to provide this policy to the UE so they do not conflict with each other.

Figure 7:
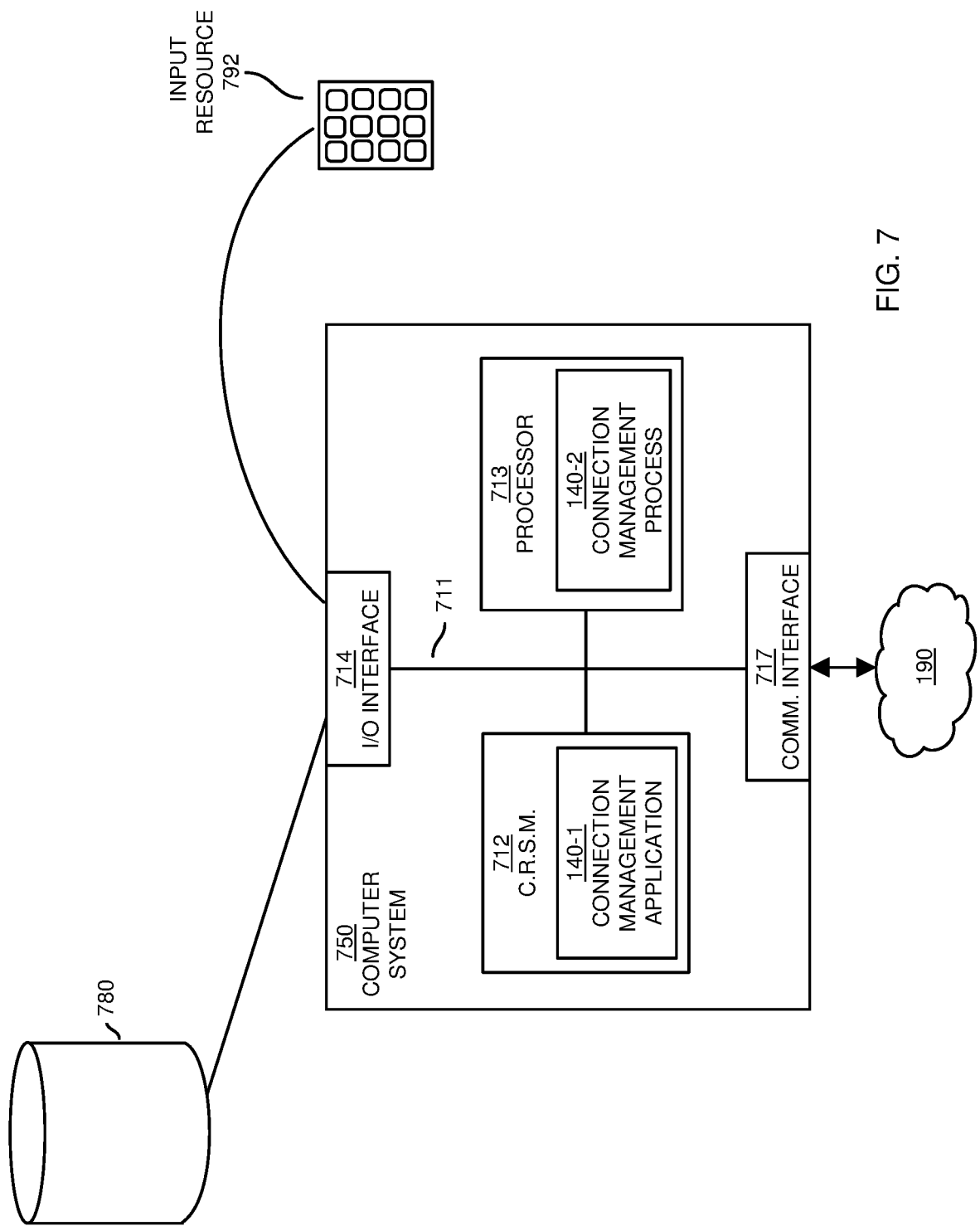
FIG. 7 is an example diagram illustrating computer architecture in which to execute any of the disclosed operations according to embodiments herein.

FIG. 7 is an example block diagram of a computer system for implementing any of the operations as discussed herein according to embodiments herein.

Any of the resources (such as communication devices, shared wireless access node 120, etc.) as discussed herein can be configured to include a processor and executable instructions (of a respective communication management resource) to carry out any of the operations as discussed herein.

As shown, computer system 750 of the present example includes an interconnect 711 coupling computer readable storage media 712 such as a non-transitory type of media (such as a hardware storage medium) in which digital information can be stored and retrieved, a processor 713 (computer processor hardware), I/O interface 714, and a communications interface 717. I/O interface 714 supports connectivity to repository 780 and input resource 792.

Computer readable storage medium 712 (hardware to store instructions) can be any hardware storage device such as memory, optical storage, hard drive, floppy disk, etc. In one embodiment, the computer readable storage medium 712 stores instructions and/or data.

As shown, computer readable storage media 712 can be encoded with connection management application 140-1 (e.g., including instructions) to carry out any of the operations as discussed herein.

During operation of one embodiment, processor 713 accesses computer readable storage media 712 via the use of interconnect 711 in order to launch, run, execute, interpret or otherwise perform the instructions in connection management application 140-1 stored on computer readable storage medium 712. Execution of the connection management application 140-1 produces connection management process 140-2 to carry out any of the operations and/or processes as discussed herein.

Those skilled in the art will understand that the computer system 750 can include other processes and/or software and hardware components, such as an operating system that controls allocation and use of hardware resources to connection management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 750 may reside at any location or can be included in any suitable resource in any network environment to implement functionality as discussed herein.

Functionality supported by the different resources will now be discussed via flowcharts in FIGS. 8-10. Note that the steps in the flowcharts below can be executed in any suitable order.

Figure 8:
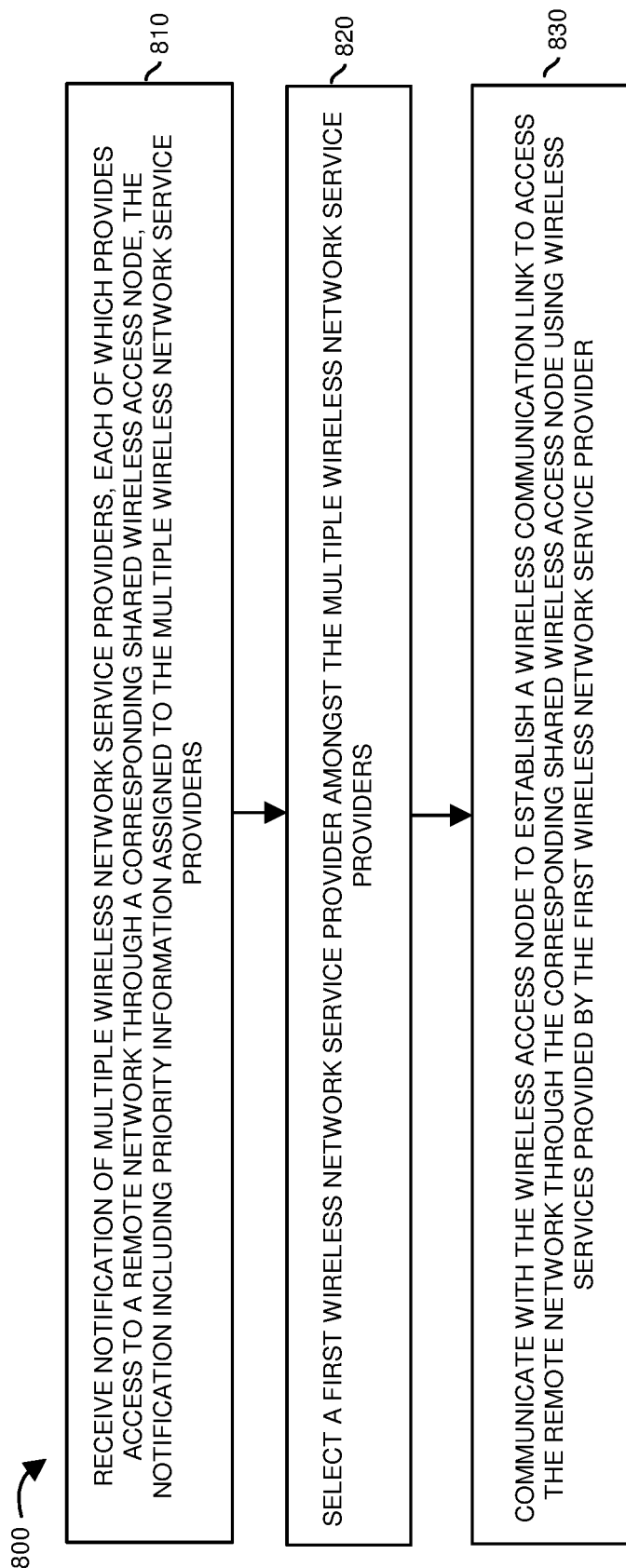
FIG. 8 is an example diagram illustrating a method according to embodiments herein.

FIG. 8 is a flowchart 800 illustrating an example method according to embodiments. Note that there will be some overlap with respect to concepts as discussed above.

In processing operation 810, the mobile communication device 131 receives notification of multiple wireless network service providers that provide access to a remote network 190 through a corresponding shared wireless access node 120. The notification includes priority information (such as via connection information 150) assigned to the multiple wireless network service providers and corresponding services.

In processing operation 820, the mobile communication device 131 selects a first wireless network service provider amongst the multiple wireless network service providers based on the priority information.

In processing operation 830, the mobile communication device 131 communicates with the wireless access node 120 to establish a wireless communication link 127 to access the remote network 190 through the corresponding shared wireless access node 120 using wireless services provided by the first wireless network service provider.

Figure 9:
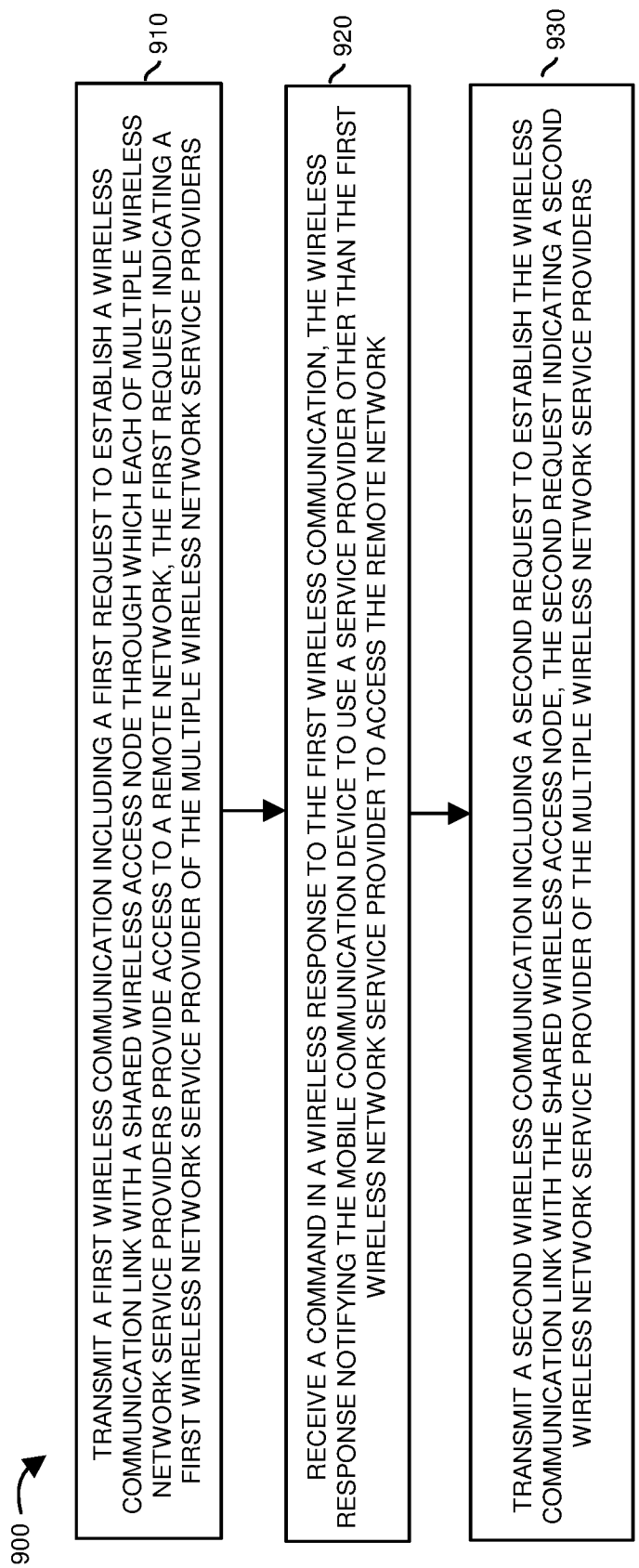
FIG. 9 is an example diagram illustrating a method according to embodiments herein.

FIG. 9 is a flowchart 900 illustrating an example method according to embodiments. Note that there will be some overlap with respect to concepts as discussed above.

In processing operation 910, the mobile communication device 120-1 transmits a first wireless communication including a first request to establish a wireless communication link 127 with a shared wireless access node 120 through which each of multiple wireless network service providers provide access to a remote network 190. The first request indicates a first wireless network service provider of the multiple wireless network service providers.

In processing operation 920, the mobile communication device 131 receives a command in a wireless response to the first wireless communication, the wireless response notifying the mobile communication device 131 to use a service provider other than the first wireless network service provider to access the remote network 190.

In processing operation 930, the mobile communication device 120-1 transmits a second wireless communication including a second request to establish the wireless communication link 127 with the shared wireless access node 120, the second request indicating a second wireless network service provider of the multiple wireless network service providers.

Figure 10:
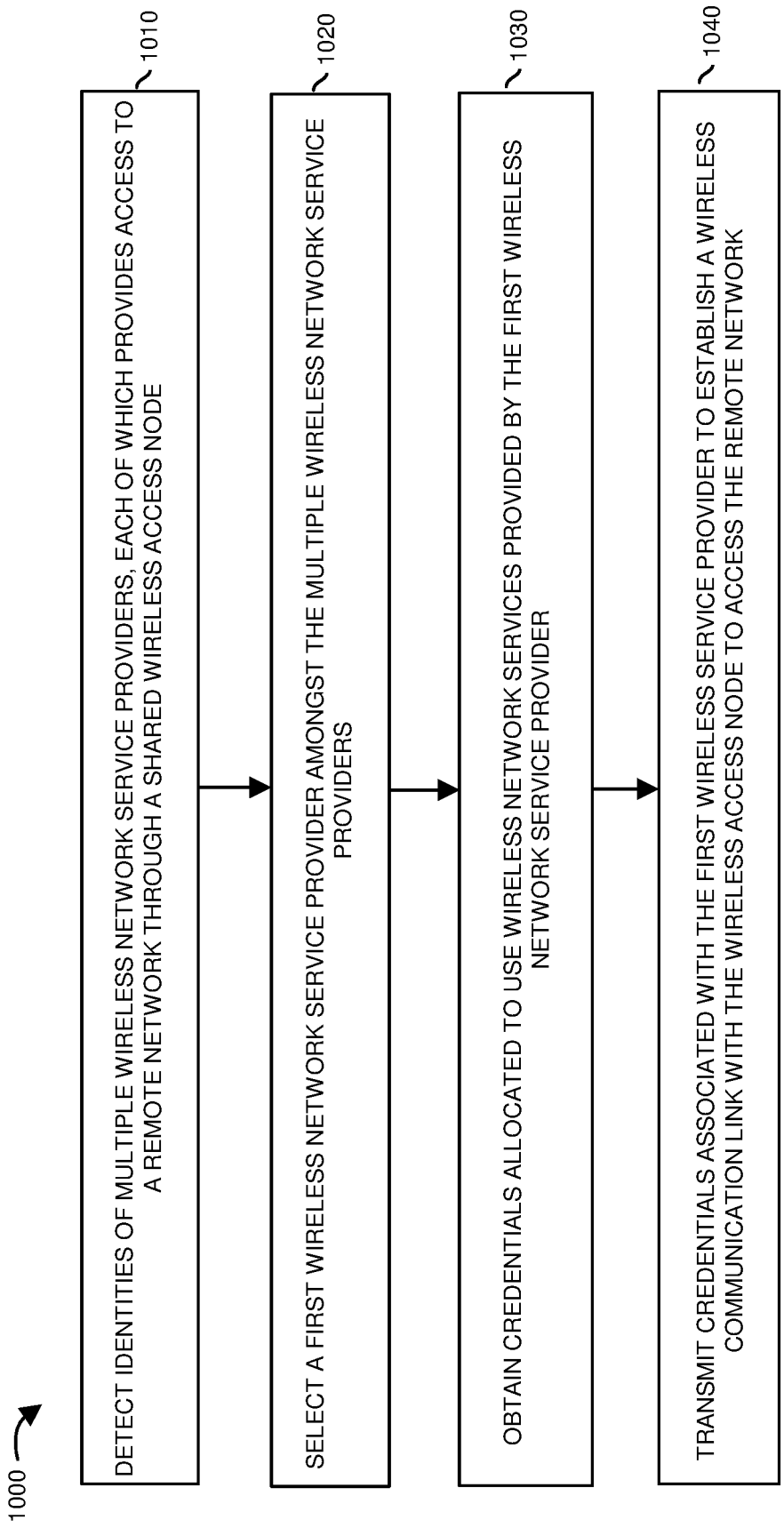
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the mobile communication device 131 detects identities of multiple wireless network service providers, each of which provides access to a remote network 190 through a shared wireless access node 120.

In processing operation 1020, the mobile communication device 120-1 selects a first wireless network service provider amongst the multiple wireless network service providers.

In processing operation 1030, the mobile communication device 120-1 obtains credentials allocated to use wireless network services provided by the first wireless network service provider.

In processing operation 1040, the mobile communication device 120-1 transmits credentials associated with the first wireless service provider to establish a wireless communication link 127 with the wireless access node 120 to access the remote network 190.

Note again that techniques herein are well suited to support use and selection amongst wireless services provided by multiple service providers from a shared wireless access node. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
at a shared wireless access node:
transmitting a notification indicating identities of multiple wireless network service providers to a mobile communication device, each of the multiple wireless network service providers available to provide access to a remote network through the shared wireless access node, the notification further including priority information assigned to the multiple wireless network service providers; and
receiving communications from the mobile communication device, the communications indicating a first wireless network service provider selected from the identities to establish a wireless communication link.

2. The method as in claim 1 further comprising:
via the shared wireless access node, establishing the wireless communication link with the mobile communication device via the first wireless network service provider requested by the mobile communication device.

3. The method as in claim 1, wherein the priority information indicates a respective ranking of the multiple wireless network service providers associated with the wireless access node.

4. The method as in claim 3, wherein the mobile communication device is operable to:
identify a subset of the multiple wireless network service providers to which a subscriber of the mobile communication device subscribes; and
select the first wireless network service provider from the subset based on the respective ranking.

5. The method as in claim 3, wherein the priority information indicates an ordered preference in which to select amongst the identities of the multiple wireless network service providers to access the remote network through the wireless access node shared by the multiple wireless network service providers.

6. The method as in claim 1, wherein the mobile communication device is operable to retrieve a first set of credentials amongst multiple sets of credentials, the first set of credentials allocated to provide use of wireless network services provided by the first wireless network service provider, the method further comprising:
receiving the first set of credentials at the shared wireless access node, the first set of credentials sent by the mobile communication device to use the wireless network services provided by the first wireless network service provider.

7. The method as in claim 5 further comprising:
receiving a second set of credentials at the wireless access node in response to the mobile communication device detecting an inability to authenticate the mobile communication device using the first set of credentials, the mobile communication device providing the second set of credentials to authenticate the mobile communication device.

8. The method as in claim 1 further comprising:
communicating the notification as a wireless communication from the wireless access node to the mobile communication device.

9. The method as in claim 1, wherein the mobile communication device is allocated first authentication credentials to use wireless network services provided by the first wireless network service provider; and
wherein the mobile communication device is allocated second authentication credentials to use wireless network services provided by a second wireless network service provider of the multiple wireless network service providers.

10. The method as in claim 1, wherein the shared wireless access node and the mobile communication device communicate with each other via bandwidth allocated from the CBRS (Citizen Band Radio Service) band.

11. The method as in claim 1, wherein the shared wireless access node and the mobile communication device wirelessly communicate with each other via LTE (Long Term Evolution) communications.

12. A system comprising:
a shared wireless access node operable to:
transmit a notification of multiple wireless network service providers to a mobile communication device, each of the multiple wireless network service providers available to provide access to a remote network through the shared wireless access node, the notification including priority information assigned to the multiple wireless network service providers; and
receive communications from the mobile communication device, the communications indicating a first wireless network service provider in which to establish a wireless communication link with the mobile communication device.

13. The system as in claim 12, wherein the shared wireless access node is operative to establish the wireless communication link with the mobile communication device via the first wireless network service provider requested by the mobile communication device.

14. The system as in claim 12, wherein the priority information indicates a respective ranking of the multiple wireless network service providers associated with the wireless access node.

15. The system as in claim 14, wherein the mobile communication device is operable to:
identify a subset of the multiple wireless network service providers to which a subscriber of the mobile communication device subscribes; and
select the first wireless network service provider from the subset based on the respective ranking.

16. The system as in claim 14, wherein the priority information indicates an ordered preference in which to select amongst identities of the multiple wireless network service providers to access the remote network through the wireless access node shared by the multiple wireless network service providers.

17. The system as in claim 12, wherein the mobile communication device is operable to retrieve a first set of credentials amongst multiple sets of credentials, the first set of credentials allocated to provide use of wireless network services provided by the first wireless network service provider; and
wherein the shared wireless access node is operative to receive the first set of credentials, the first set of credentials sent by the mobile communication device to use the wireless network services provided by the first wireless network service provider.

18. The system as in claim 16, wherein the shared wireless access node is further operative to:
receive a second set of credentials at the wireless access node in response to the mobile communication device detecting an inability to authenticate the mobile communication device using the first set of credentials, the mobile communication device providing the second set of credentials to authenticate the mobile communication device.

19. The system as in claim 12, wherein the shared wireless access node is further operative to:
communicate the notification as a wireless communication from the wireless access node to the mobile communication device.

20. The system as in claim 12, wherein the mobile communication device is allocated first authentication credentials to use wireless network services provided by the first wireless network service provider; and
wherein the mobile communication device is allocated second authentication credentials to use wireless network services provided by a second wireless network service provider of the multiple wireless network service providers.

21. The system as in claim 12, wherein the shared wireless access node and the mobile communication device communicate with each other via bandwidth allocated from the CBRS (Citizen Band Radio Service) band.

22. The system as in claim 12, wherein the shared wireless access node and the mobile communication device wirelessly communicate with each other via LTE (Long Term Evolution) communications.

23. Computer-readable storage hardware having instructions stored thereon, the instructions, when carried out by computer processor hardware, cause the computer processor hardware to:
transmit a notification indicating identities of multiple wireless network service providers to a mobile communication device, each of the multiple wireless network service providers available to provide access to a remote network through the shared wireless access node, the notification further including priority information assigned to the multiple wireless network service providers; and
receive communications from the mobile communication device, the communications indicating a first wireless network service provider selected from the identities to establish a wireless communication link.

\* \* \* \* \*